(12) United States Patent
Hei et al.

(10) Patent No.: US 11,757,285 B2
(45) Date of Patent: Sep. 12, 2023

(54) ENERGY STORAGE SYSTEM AND RELATED METHOD

(71) Applicant: Huawei Digital Power Technologies Co., Ltd., Shenzhen (CN)

(72) Inventors: Chang Hei, Shanghai (CN); Zhipeng Wu, Shenzhen (CN); Shuchao Wang, Shanghai (CN)

(73) Assignee: HUAWEI DIGITAL POWER TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/743,593

(22) Filed: May 13, 2022

(65) Prior Publication Data

US 2022/0368134 A1    Nov. 17, 2022

(30) Foreign Application Priority Data

May 14, 2021    (CN) .......................... 202110533486.5

(51) Int. Cl.
    *H02J 3/32*       (2006.01)
    *G06Q 10/0631*    (2023.01)
    *H02J 3/38*       (2006.01)
    *G05B 19/042*     (2006.01)

(52) U.S. Cl.
    CPC .............. *H02J 3/32* (2013.01); *G05B 19/042* (2013.01); *G06Q 10/06312* (2013.01); *H02J 3/381* (2013.01); *G05B 2219/2639* (2013.01); *H02J 2300/20* (2020.01)

(58) Field of Classification Search
    CPC ...... H02J 3/32; H02J 3/38; H02J 3/381; H02J 2300/20; G05B 19/042; G06Q 10/06312; G06Q 10/0631
    See application file for complete search history.

(56) References Cited

U.S. PATENT DOCUMENTS

| 2014/0117756 | A1 | 5/2014 | Takahashi et al. |
| 2016/0226243 | A1 | 8/2016 | Djan-Sampson et al. |
| 2020/0091855 | A1 | 3/2020 | Pevear et al. |
| 2020/0280191 | A1 | 9/2020 | Lee |

FOREIGN PATENT DOCUMENTS

| CN | 106786756 A | 5/2017 |
| CN | 107732947 A | 2/2018 |
| CN | 108462195 A | 8/2018 |
| CN | 109193776 A | 1/2019 |
| CN | 109347094 A | 2/2019 |
| CN | 110009227 A | 7/2019 |

(Continued)

OTHER PUBLICATIONS

Extended European Search Report issued in EP22173237.3, dated Sep. 28, 2022, 6 pages.

(Continued)

*Primary Examiner* — Robert L Deberadinis

(57) ABSTRACT

An example energy storage system and a related method are disclosed. In the energy storage system, a controller obtains information about user equipment, and then controls a converter and a battery group based on the information about the user equipment, to supply electric energy to an electric device or receive electric energy from a power sourcing device. In this way, the energy storage system can provide reasonable power scheduling, thereby improving utilization of the energy storage system.

17 Claims, 4 Drawing Sheets

(56) References Cited

FOREIGN PATENT DOCUMENTS

| | | |
|---|---|---|
| CN | 110021946 A | 7/2019 |
| CN | 111369385 A | 7/2020 |
| EP | 2953230 A1 | 12/2015 |
| KR | 101991759 B1 | 6/2019 |
| WO | 2018230831 A1 | 12/2018 |

OTHER PUBLICATIONS

Office Action issued in CN202110533486.5, dated Jun. 19, 2023, 7 pages.

ENERGY STORAGE SYSTEM AND RELATED METHOD

CROSS-REFERENCE TO RELATED APPLICATION

This application claims priority to Chinese Patent Application No. 202110533486.5, filed on May 14, 2021, which is hereby incorporated by reference in its entirety.

TECHNICAL FIELD

Embodiments of this application relate to the field of energy storage technologies, and in particular, to an energy storage system and a related method.

BACKGROUND

In recent years, new energy power generation, mainly photovoltaic and wind power generation, has been developing rapidly. However, photovoltaic and wind power and other primary energy resources are fluctuating and intermittent. Further with different characteristics of a grid-connected power electronics device from those of a conventional electric generating set, a large number of connections in new energy power generation lead to new problems for an electric power system, and an energy storage system is considered an effective way to resolve the problems.

Therefore, in recent years, energy storage technologies have developed rapidly and have had a more extensive application to electric power systems. An energy storage system can provide a variety of functional services to an electric power system, for example, services of power supply reliability, electricity demand management, services of power supply quality, demand-side responses, grid frequency regulation, grid peak load regulation, voltage support, fluctuations smoothing, and optimal set operation.

However, the foregoing functional services all need to match an output power, remaining stored energy, and the like of the energy storage system. If the foregoing functional services cannot be reasonably deployed, the output power, the remaining stored energy, and the like of the energy storage system cannot support a corresponding functional service, leading to an inability of the energy storage system to provide functional services normally, and in even worse cases, causing a failure of the energy storage system.

SUMMARY

Embodiments of this application provide an energy storage system and a related method, to provide users with reasonable resource allocation for reasonable power scheduling.

According to a first aspect, an embodiment of this application provides an energy storage system, including a plurality of sets of battery packs or a plurality of battery packs, a converter, and a controller, where the battery packs are connected to a grid through the converter, at least one piece of user equipment is connected to the grid, and each of the at least one piece of user equipment includes at least one of electrical equipment and power supply equipment; the controller communicates with the user equipment and is configured to obtain information about the user equipment; and the controller is connected to the converter and the battery packs and is configured to control the converter and the battery packs based on the information about the user equipment, to provide electric energy to the electrical equipment or receive electric energy from the power supply equipment.

In the energy storage system provided in this embodiment, the controller obtains the information about the user equipment, and then controls the converter and the battery packs based on the information about the user equipment, to provide electric energy to the electrical equipment or receive electric energy from the power supply equipment. This embodiment can provide reasonable power scheduling, thereby improving utilization of the energy storage system.

With reference to the first aspect, in an implementation of this embodiment, the electrical equipment includes at least one of a factory power distribution room, a power distribution room in a residential quarter, and a substation, and the power supply equipment includes at least one of another energy storage system, a photovoltaic power generation system, a wind power generation system, and a power plant. This implementation makes the solution provided in this embodiment more comprehensive.

With reference to the first aspect, in an implementation of this embodiment, the controller is further configured to: determine actual user scheduling powers of all pieces of user equipment based on the information about the user equipment; and control the converter to output a power corresponding to a sum of the actual user scheduling powers of all the pieces of user equipment to the grid. This implementation makes the solution provided in this embodiment of this application more comprehensive.

With reference to the first aspect, in an implementation of this embodiment of this application, the controller is further configured to: obtain at least one power scheduling request from the user equipment, where the power scheduling request includes a charging and discharging power of the energy storage system requested by the user equipment; obtain a configured user power range and remaining chargeable and dischargeable energy that correspond to the user equipment, where the user power range is used to indicate a range of charging and discharging power allocated by the energy storage system to the user equipment, the remaining chargeable and dischargeable energy includes remaining dischargeable electric energy, the remaining dischargeable electric energy is used to indicate energy that excludes used energy and remains in energy allocated by the energy storage system to the user equipment, and the used energy is energy that the energy storage system has actually scheduled to the user equipment; determine an actual user scheduling power corresponding to the power scheduling request based on the power scheduling request, the user power range, and the remaining chargeable and dischargeable energy; and sum up all the actual user scheduling powers and send a sum to the energy storage system, so that the energy storage system schedules the user equipment based on the actual user scheduling powers that are summed up. This implementation makes the solution provided in this embodiment of this application more comprehensive.

With reference to the first aspect, in an implementation of this embodiment of this application, if the charging and discharging power of the energy storage system requested by the user equipment in the power scheduling request is out of the user power range, the controller revises the charging and discharging power requested to be provided by the energy storage system to be within the user power range. This implementation makes the solution provided in this embodiment of this application more comprehensive.

With reference to the first aspect, in an implementation of this embodiment of this application, the user power range is associated with the user equipment and a function category. The function category indicates a function requested by the user equipment; the controller determines, based on the power scheduling request, a user equipment identifier and a function category identifier that correspond to the charging and discharging power; and the controller determines the configured user power range corresponding to the user equipment identifier and the function category identifier. This implementation makes the solution provided in this embodiment of this application more comprehensive.

With reference to the first aspect, in an implementation of this embodiment of this application, if the remaining chargeable and dischargeable energy is not within a preset range, the controller sets the actual user scheduling power corresponding to the power scheduling request to a specific range. This implementation makes the solution provided in this embodiment of this application more comprehensive.

With reference to the first aspect, in an implementation of this embodiment of this application, if the remaining dischargeable electric energy in the remaining chargeable and dischargeable energy is less than a first preset value, the controller sets the actual user scheduling power corresponding to the power scheduling request to be not greater than 0; and if remaining chargeable electric energy in the remaining chargeable and dischargeable energy is less than a second preset value, the controller sets the actual user scheduling power corresponding to the power scheduling request to be not less than 0, where the remaining chargeable electric energy indicates energy that the energy storage system allows the user equipment to charge the energy storage system. This implementation makes the solution provided in this embodiment of this application more comprehensive.

With reference to the first aspect, in an implementation of this embodiment of this application, the controller is further configured to update the remaining chargeable and dischargeable energy at intervals of preset time segments based on the actual user scheduling power and a running time of the user equipment. This implementation makes the solution provided in this embodiment of this application more comprehensive.

With reference to the first aspect, in an implementation of this embodiment of this application, the controller is further configured to: determine an initial energy value of the user equipment based on a ratio of allocated stored energy that the user equipment is allowed to use to all energy currently stored in the energy storage system; determine used energy corresponding to the user equipment at intervals of preset time segments based on the actual user scheduling power and the running time of the user equipment; determine remaining energy of each user equipment based on the initial energy value corresponding to the user equipment and the used energy; and determine the remaining chargeable and dischargeable energy by summing up the remaining energy of the user equipment. This implementation makes the solution provided in this embodiment of this application more comprehensive.

According to a second aspect, an embodiment of this application provides a method for scheduling an energy storage system, including: obtaining at least one power scheduling request from user equipment, where the power scheduling request includes a charging and discharging power of the energy storage system requested by the user equipment; obtaining a configured user power range and remaining chargeable and dischargeable energy that correspond to the user equipment, where the user power range is used to indicate a range of charging and discharging power allocated by the energy storage system to the user equipment, the remaining chargeable and dischargeable energy includes remaining dischargeable electric energy, the remaining dischargeable electric energy is used to indicate energy that excludes used energy and remains in energy allocated by the energy storage system to the user equipment, and the used energy is energy that the energy storage system has actually scheduled to the user equipment; determining an actual user scheduling power corresponding to the power scheduling request based on the power scheduling request, the user power range, and the remaining chargeable and dischargeable energy; and summing up all the actual user scheduling powers and sending a sum to the energy storage system, so that the energy storage system schedules the user equipment based on the actual user scheduling powers that are summed up.

With reference to the second aspect, in an implementation of this embodiment of this application, the determining an actual user scheduling power based on the power scheduling request, the user power range, and the remaining chargeable and dischargeable energy includes: if the charging and discharging power of the energy storage system requested by the user equipment in the power scheduling request is out of the user power range, revising the charging and discharging power requested to be provided by the energy storage system to be within the user power range. This implementation makes the solution provided in this embodiment of this application more comprehensive.

With reference to the second aspect, in an implementation of this embodiment of this application, the user power range is associated with the user equipment and a function category. The function category indicates a function requested by the user equipment. The obtaining a configured user power range corresponding to the user equipment includes: determining, based on the power scheduling request, a user equipment identifier and a function category identifier that correspond to the charging and discharging power; and determining the configured user power range corresponding to the user equipment identifier and the function category identifier. This implementation makes the solution provided in this embodiment of this application more comprehensive.

With reference to the second aspect, in an implementation of this embodiment of this application, the determining an actual user scheduling power corresponding to the power scheduling request based on the power scheduling request, the user power range, and the remaining chargeable and dischargeable energy includes: setting the actual user scheduling power corresponding to the power scheduling request to a specific range if the remaining chargeable and dischargeable energy is not within a preset range. This implementation makes the solution provided in this embodiment of this application more comprehensive.

With reference to the second aspect, in an implementation of this embodiment of this application, the setting the actual user scheduling power corresponding to the power scheduling request to a specific range if the remaining chargeable and dischargeable energy is not within a preset range includes: if the remaining dischargeable electric energy in the remaining chargeable and dischargeable energy is less than a first preset value, setting the actual user scheduling power corresponding to the power scheduling request to be not greater than 0; and if remaining chargeable electric energy in the remaining chargeable and dischargeable energy is less than a second preset value, setting the actual user scheduling power corresponding to the power scheduling request to be not less than 0, where the remaining chargeable electric energy indicates energy that the energy storage system allows the user equipment to charge the energy storage system. This implementation makes the solution provided in this embodiment of this application more comprehensive.

With reference to the second aspect, in an implementation of this embodiment of this application, after the summing up all the actual user scheduling powers and sending a sum to the energy storage system, the method further includes: updating the remaining chargeable and dischargeable energy at intervals of preset time segments based on the actual user scheduling power and a running time of the user equipment. This implementation makes the solution provided in this embodiment of this application more comprehensive.

With reference to the second aspect, in an implementation of this embodiment of this application, the updating the remaining chargeable and dischargeable energy at intervals of preset time segments based on the actual user scheduling power and a running time of the user equipment includes: determining an initial energy value of the user equipment based on a ratio of allocated stored energy that the user equipment is allowed to use to all energy currently stored in the energy storage system; determining used energy corresponding to the user equipment at intervals of preset time segments based on the actual user scheduling power and the running time of the user equipment; determining remaining energy of each user equipment based on the initial energy value corresponding to the user equipment and the used energy; and determining the remaining chargeable and dischargeable energy by summing up the remaining energy of the user equipment. This implementation makes the solution provided in this embodiment of this application more comprehensive.

DESCRIPTION OF EMBODIMENTS

Figure 1:
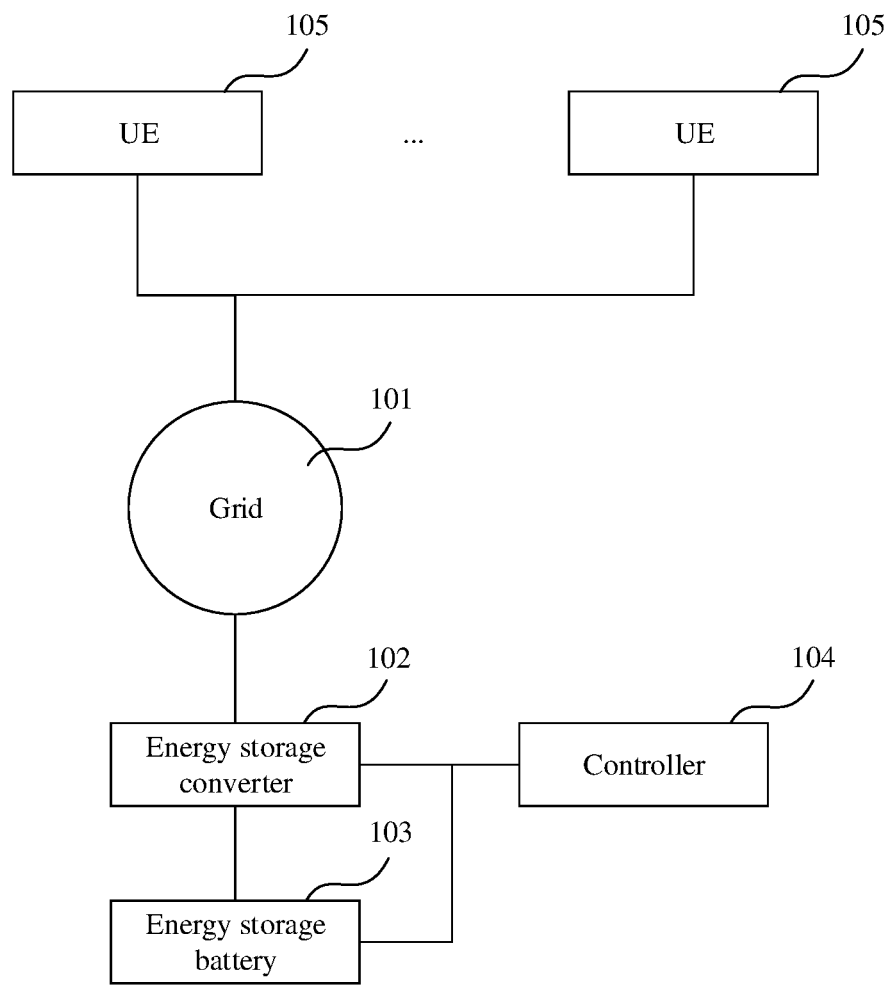
FIG. 1 is a schematic diagram of an energy storage system according to an embodiment of this application.

Embodiments of this application provide an energy storage system and a related method, to provide users with reasonable resource allocation for reasonable power scheduling.

In the specification, claims, and accompanying drawings of this application, the terms "first", "second", "third", "fourth", and the like (if existent) are intended to distinguish between similar objects but do not necessarily indicate a specific order or sequence. It should be understood that the data termed in such a way are interchangeable in proper circumstances, so that embodiments described herein can be implemented in an order other than the order illustrated or described herein. Moreover, the terms "include", "correspond to" and any other variants mean to cover the non-exclusive inclusion, for example, a process, method, system, product, or device that includes a list of steps or units is not necessarily limited to those expressly listed steps or units, but may include other steps or units not expressly listed or inherent to such a process, method, system, product, or device.

In embodiments of this application, words such as "example" or "for example" are used to indicate examples, instances, or descriptions. Any embodiment or solution described as "example" or "for example" in embodiments of this application is not to be construed as being more preferred or advantageous than other embodiments or solutions. Exactly, use of the word "example" or "for example" or the like is intended to present a relative concept in a specific manner.

In recent years, energy storage technologies have developed rapidly and have had a more extensive application to electric power systems. An energy storage system can provide a variety of functional services to an electric power system, for example, services of power supply reliability, electricity demand management, services of power supply quality, demand-side responses, grid frequency regulation, grid peak load regulation, voltage support, fluctuations smoothing, and optimal set operation. In addition, one energy storage system usually needs to provide the foregoing functional services to a plurality pieces of user equipment.

If the foregoing functional services cannot be reasonably deployed, the output power, the remaining stored energy, and the like of the energy storage system cannot support a corresponding functional service, leading to an inability of the energy storage system to provide functional services normally. In even worse cases, a failure of the energy storage system may be caused.

If the foregoing functional services can be reasonably deployed, one energy storage system can support a plurality of functional applications by configuring reasonable powers and capacities, getting a balanced discharge rate, reducing energy degradation, and further gaining benefits in many aspects. Further, the energy storage system may be designed to be shared among a plurality of users and to provide different combinations of functional services to different users, having advantages of convenient operation and maintenance, easy management, low construction costs, and the like. Further, the value of the energy storage system is fully utilized to improve cost-effectiveness of investment.

Therefore, how to provide reasonable power and capacity allocation to a plurality of users and a plurality of functions is an important trend of research by a person skilled in the art.

At present, a manner in which an energy storage system provides two or more functions at the same time is to overlay instructions or perform selection based on priorities by using control equipment on a side of a station, for example, an energy management system (EMS) and fast-frequency and automatic generation control (AGC) equipment. However, in this manner, partitions cannot be made between energy and powers for different users or functions, and consequently, independence of a single function cannot be ensured. In the method in which prioritization is performed only when there are conflicts in a simple manner of "first come, first served" for control, there is a relatively high probability that a function occupies a power channel or consumes all usable energy in an energy storage system, leading to interruption of other functional services.

At present, another manner in which an energy storage system provides two or more functions at the same time is to reserve a fixed power/energy (SOC) to ensure continuity of a function of a high priority. For example, an energy storage system on a small and medium-sized user side usually may reserve specific energy to ensure power supply reliability. However, in this manner, partitions cannot be made between energy and powers for different users or functions, and consequently, independence of a single function cannot be ensured. Simply monotonic settings for powers/energy are often for a backup function and not applicable to a scenario with a plurality of users and a plurality of functions, and cannot be applied to managing functions that are often run at the same time or alternately. Specifying a fixed reserve capacity for a single function greatly reduces system utilization.

In view of this, embodiments of this application provide an energy storage system and a related method, to provide users with reasonable resource allocation for reasonable power and energy scheduling. FIG. 1 is a schematic diagram of an energy storage system according to an embodiment of this application. The energy storage system includes an energy storage converter 102, an energy storage battery 103, and a controller 104. The energy storage battery 103 is connected to a grid 101 through the energy storage converter 102; and the controller 104 is connected to the energy storage converter 102 and is configured to deliver an actual user scheduling power to the energy storage converter 102.

It can be understood that the energy storage battery 103 may be formed by a plurality of sets of battery packs or a plurality of battery packs, and these battery packs are connected to each other in series or in parallel, to form a battery pack array. In actual application, the energy storage battery 103 may be a photovoltaic battery pack array. A specific form of the energy storage battery 103 is not limited in this embodiment.

Specifically, when the energy storage system provides electric energy to the grid 101, electric energy stored in the energy storage battery 103 is allocated to user equipment 105 on the grid 101 through the energy storage converter 102. When the grid 101 charges the energy storage system, electric energy on the user equipment 105 may be transmitted to the energy storage battery 103 through the grid 101 and the energy storage converter 102, to charge the energy storage battery 103. In the foregoing process, the controller 104 may perform a method for scheduling an energy storage system provided in embodiments of this application, to provide users with reasonable resource allocation for reasonable power and energy scheduling.

In this embodiment, communication between the controller 104 and the equipment 105 may be power line communication (PLC), wireless communication, or communication using another line. This is not limited in this embodiment of this application.

In this embodiment, the user equipment 105 may include electrical equipment and power supply equipment. The electrical equipment is equipment consuming electric energy, and may include, but is not limited to, at least one of a factory power distribution room, a power distribution room in a residential quarter, and a substation. In actual application, the electrical equipment may alternatively be a charging pile, a substation, or the like for new energy vehicles. This is not limited in this embodiment. The power supply equipment is equipment providing electric energy, and may include, but is not limited to, at least one of another energy storage system, a photovoltaic power generation system, a wind power generation system, and a power plant. In actual application, the power supply equipment may alternatively be a tidal power generation system, a hydroelectric power generation system, or the like. This is not limited in this embodiment.

In this embodiment, the controller 104 is configured to: determine actual user scheduling powers of all pieces of user equipment 105 based on information about the user equipment 105; and control the energy storage converter 102 to output a power corresponding to a sum of the actual user scheduling powers of all the pieces of user equipment 105 to the grid 101. For example, the grid 101 is currently connected to a total of three pieces of user equipment 105, namely, a power plant, a factory power distribution room, and a power distribution room in a residential quarter. An actual user scheduling power of the power plant is −5,000 kW, an actual user scheduling power of the factory power distribution room is +6,000 kW, and an actual user scheduling power of the power distribution room in the residential quarter is +3,000 kW. In this case, a sum +4,000 kW of the actual user scheduling powers may be obtained through calculation, and after obtaining the sum of the actual user scheduling powers through calculation, the controller 104 may control the energy storage converter 102 to output a power of 4,000 kW to the grid 101.

Specifically, the controller 104 may determine the actual user scheduling powers of all the pieces of user equipment 105 based on the information about the user equipment 105 according to the method for scheduling an energy storage system provided in embodiments of this application. The method for scheduling an energy storage system is described in detail below.

Figure 2:
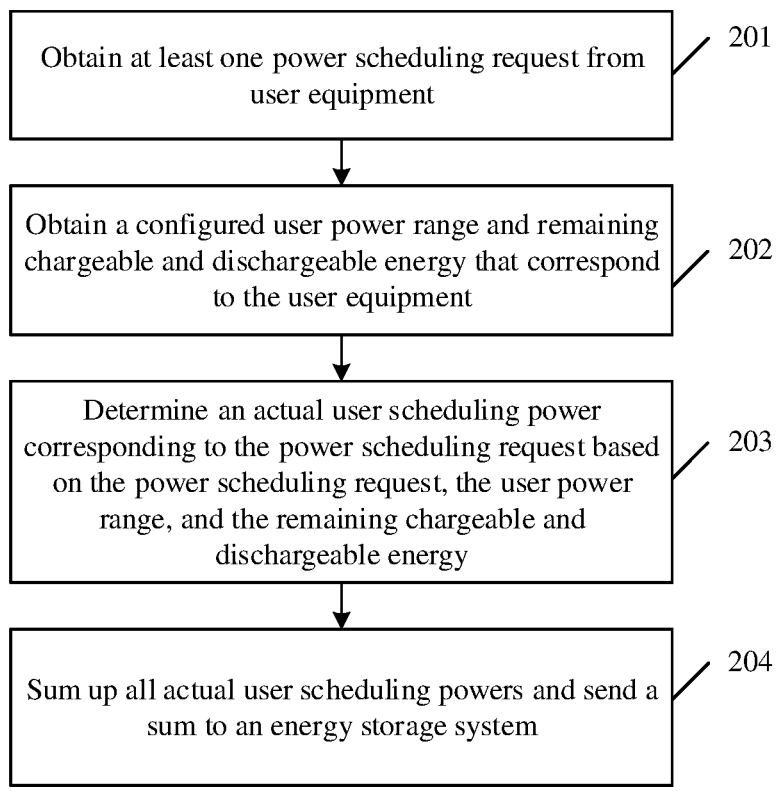
FIG. 2 is a schematic diagram of a method for scheduling an energy storage system according to an embodiment of this application.

FIG. 2 is a schematic diagram of a method for scheduling an energy storage system according to an embodiment of this application. The method includes:

201. Obtain at least one power scheduling request from user equipment.

In this embodiment, the power scheduling request includes a charging and discharging power and charging and discharging energy of an energy storage system requested by the user equipment. The charging and discharging power of the energy storage system requested by the user equipment refers to a power request between the user equipment and the energy storage system. For example, the user equipment intends to obtain electricity with a power of 500 w from the energy storage system. In the power scheduling request sent by the user equipment to the energy storage system, the charging and discharging power of the energy storage system requested by the user equipment may be +500 w. If the user equipment intends to provide electricity with a power of 500 w to the energy storage system, the charging and discharging power of the energy storage system requested by the user equipment may be −500 w. Similarly, the charging and discharging energy of the energy storage system requested by the user equipment refers to an electric energy request between the user equipment and the energy storage system. For example, the user equipment intends to obtain energy of 500 kilowatts-hour from the energy storage system. In the power scheduling request sent by the user equipment to the energy storage system, the charging and discharging energy of the energy storage system requested by the user equipment may be +500 kilowatts-hour. If the user equipment provides energy of 500 kilowatts-hour to the energy storage system, the charging and discharging energy of the energy storage system requested by the user equipment may be −500 kilowatts-hour.

In this embodiment, the user equipment may be any apparatus or system on the grid 101 that can consume or provide electric energy. For example, the user equipment may be another energy storage system, may be a power plant, may be a new energy power generation system, for example, a wind power generation system or a photovoltaic power generation system, or may be an electrical system, for example, a power distribution room in a factory or in a residential quarter. This is not limited in this embodiment of this application.

In some embodiments, the power scheduling request may further include an identifier of user equipment, where the identifier is used to indicate user equipment that has sent the power scheduling request. For example, an identifier of a power plant A is 007, and in this case, a power scheduling request sent by the power plant A to the energy storage system may carry the identifier 007, which is used to indicate that the power scheduling request is sent by the power plant A. The energy storage system may sum up power scheduling requests carrying the identifier 007, and then comprehensively configure a reasonable power and reasonable energy for the power plant A.

In this embodiment, the power scheduling request may be obtained by the controller 104 from the user equipment, or may be generated according to instructions in effect before the current scheduling. For example, before the current scheduling, user equipment A already uses a power of 300 w from the energy storage system. In this case, a type of power scheduling request may be generated to request a charging and discharging power of 300 w for the user equipment from the energy storage system. In actual application, the controller 104 may alternatively sum up all historical power scheduling requests and new power scheduling requests in another manner. This is not limited in this embodiment of this application.

202. Obtain a configured user power range and remaining chargeable and dischargeable energy that correspond to the user equipment.

Before step 202, the controller 104 may configure the related user power range and remaining chargeable and dischargeable energy for the user equipment in advance.

In this embodiment, the user power range is used to indicate a range of a charging and discharging power allocated by the energy storage system to the user equipment. For example, the energy storage system is expected to be able to provide a power of 500 w to the user equipment A, but does not accept electric energy from the user equipment A. In this case, a range of a charging and discharging power allocated by the energy storage system to the user equipment A may be 0 w to 500 w. For example, the energy storage system is expected to be able to provide a power of 500 w to user equipment B, and further accepts electric energy with a power of 300 w transmitted by the user equipment B to the energy storage system. In this case, a range of a charging and discharging power allocated by the energy storage system to the user equipment B may be −300 w to 500 w. In actual application, the energy storage system may alternatively allocate another range of a charging and discharging power to the user equipment based on characteristics of the user equipment. This is not limited in this embodiment of this application.

In this embodiment, the remaining chargeable and dischargeable energy includes remaining dischargeable electric energy, where the remaining dischargeable electric energy is used to indicate energy that excludes used energy and remains in energy allocated by the energy storage system to the user equipment, and the used energy is energy that the energy storage system has actually scheduled to the user equipment. The remaining chargeable and dischargeable energy further includes remaining chargeable electric energy, where the remaining chargeable electric energy is obtained by subtracting the remaining dischargeable electric energy from an initial value of energy allocated to the user equipment. The initial value of energy allocated to the user equipment may be obtained according to the following method:

The controller 104 may determine an initial energy value of each user equipment based on a ratio of allocated stored energy that each user equipment is allowed to use to all energy stored in the energy storage system. For example, an operator presets stored energy that the user equipment A is allowed to use to 10,000 kilowatts-hour, and presets stored energy that the user equipment B is allowed to use to 20,000 kilowatts-hour, and all the energy stored in the energy storage system is 3,000 kilowatts-hour. In this case, the controller 104 may set, based on the ratio, the initial energy value of the user equipment A to 1,000 kilowatts-hour and the initial energy value of the user equipment B to 2,000 kilowatts-hour.

Then, the controller 104 may obtain the remaining chargeable and dischargeable energy (including the remaining dischargeable electric energy and the remaining chargeable electric energy) through calculation, and the controller 104 may calculate used energy of each user equipment based on an actually scheduled power and a duration of the user equipment in a historical process. For example, an actually scheduled discharging power of the user equipment A is 1,000 w and a duration is one hour. In this case, used energy of the user equipment A is +1 kilowatt-hour (positive and negative numbers of the used energy are used to distinguish between charging and discharging, a positive number of the used energy generally indicates energy that a user has used, and a negative number of the used energy indicates energy provided by the user to the energy storage system). Finally, the controller 104 may subtract a value of the used energy from the initial energy value of the user equipment, to obtain the remaining dischargeable electric energy corresponding to the user equipment. For example, when the initial energy value of the user equipment A is 1,000 kilowatts-hour, and the used energy is +1 kilowatt-hour, remaining dischargeable electric energy of the user equipment A is 999 kilowatts-hour (if the remaining dischargeable electric energy decreases to 0 kilowatts-hour, the controller 104 does not accept a discharging power scheduling instruction of the user equipment any more). The controller 104 may determine the remaining chargeable electric energy based on the remaining dischargeable electric energy obtained through calculation and the initial energy value of the user equipment. To be specific, the remaining chargeable electric energy is equal to the initial energy value of the user equipment minus the remaining dischargeable electric energy. In this example, the remaining chargeable electric energy is equal to the initial energy value (1,000 kilowatts-hour) of the user equipment minus the remaining dischargeable electric energy (999 kilowatts-hour), that is, equal to 1 kilowatt-hour.

It can be understood that the remaining chargeable electric energy indicates energy that the energy storage system allows the user equipment to charge the energy storage system. If remaining chargeable electric energy of user equipment is less than a preset value, it indicates that the energy storage system does not allow the user equipment to charge the energy storage system. In this case, the controller 104 may adjust an actual user scheduling power of the user equipment to be not less than 0 (so that the controller 104 does not accept a discharging power scheduling instruction of the user equipment any more).

Table 1 shows an example of the configured user power range and the remaining chargeable and dischargeable energy provided in this embodiment.

TABLE 1

|  | User equipment A | User equipment B | User equipment C | User equipment D | ... |
|---|---|---|---|---|---|
| Exclusive usable power | a1 | a2 | a3 | a4 | ... |
| Exclusive usable energy | b1 | b2 | b3 | b4 | ... |
| Shared usable power | c1 | c1 | c2 | c2 | ... |
| Shared usable energy | d1 | d1 | d1 | d1 | ... |
| Group for sharing | 1 | 1 | 2 | 2 | ... |
| ... | ... | ... | ... | ... | ... |

In Table 1, algebraic signs such as a1, a2, b1, and b2 may be some value ranges, or may be a positive value or a negative value. When a positive value is used for indication, the power range is generally 0 to the positive value. When a negative value is used for indication, the power range may be the negative value to 0. For example, a1 may be 0 w to 500 w. In Table 1, the exclusive usable power indicates a user power range that can be exclusively allocated to the user equipment A. The shared usable power indicates a user power range shared among all pieces of user equipment, for example, the user equipment A and the user equipment B, in the group 1 for sharing. Generally, the controller 104 may classify a same type of user equipment into one group and give a same identifier of the group for sharing. For example, the user equipment A and the user equipment B are both power plants, and in this case, the user equipment A and the user equipment B may be classified into the group 1 for sharing.

It can be understood that the remaining dischargeable electric energy in the remaining chargeable and dischargeable energy may be the exclusive usable energy, the shared usable energy, or the like in Table 1. In step 203, if the controller 104 determines that the remaining dischargeable electric energy in the remaining chargeable and dischargeable energy is less than a preset value, the controller 104 may set an actual user scheduling power corresponding to the power scheduling request to 0. For example, if the controller 104 determines that the exclusive usable energy b1 is less than the preset value (which generally may be 0), it indicates that energy currently planned to provide to the user equipment A is very little, and the controller 104 may set an actual user scheduling power of the user equipment A to 0.

In actual application, the controller 104 may further configure user power ranges and remaining chargeable and dischargeable energy for more pieces of user equipment, or may set more configuration content (for example, a function category, an exclusive usable power, exclusive usable energy, a shared usable power, shared usable energy, a group for sharing, a priority for sharing, and whether a function is a backup function). This is not limited in this embodiment of this application.

In this embodiment, the configured user power range and the remaining chargeable and dischargeable energy may be stored in a form of a data table, for example, Table 1, or may be stored in another form. This is not limited in this embodiment of this application. The data may be stored in a form of a database file, or may be stored in another form. This is not limited in this embodiment of this application.

Table 2 shows another example of the configured user power range and the remaining chargeable and dischargeable energy provided in this embodiment of this application.

TABLE 2

|  | User equipment A | | User equipment B | | ... |
|---|---|---|---|---|---|
| Function category | Service of power supply reliability | Electricity demand management ... | Service of power supply reliability | Service of power supply quality | ... |
| Exclusive usable power | a1 | a2 ... | a3 | a4 | ... |
| Exclusive usable energy | b1 | b2 ... | b3 | b4 | ... |
| Shared usable power | c1 | c2 ... | c3 | c4 | ... |
| Shared usable energy | d1 | d2 ... | d3 | d4 | ... |
| ... | ... | ... ... | ... | ... | ... |

In some embodiments, a user power range is further associated with a function category. As shown in Table 2, various function categories of the user equipment A are different user power ranges. To be specific, a user power range configured for a service of power supply reliability is a1, and a user power range configured for electricity demand management is a2. The charging and discharging power in the power scheduling request sent by the user equipment may also be a power associated with a function category. For example, the power scheduling request may include an exclusive power required for the service of power supply reliability by the user equipment A, and in this case, after receiving the request and reading the power, the controller may compare the power with a1 to determine an actual user scheduling power. A specific description is shown in step 203.

203. Determine an actual user scheduling power corresponding to the power scheduling request based on the power scheduling request, the user power range, and the remaining chargeable and dischargeable energy.

In this embodiment, the controller 104 may determine whether the charging and discharging power of the energy storage system requested by the user equipment in the power scheduling request is out of the user power range. If the power is within the user power range, the power scheduling request is reasonable, and the controller 104 may accept the power scheduling request. If the power is out of the user power range, the power scheduling request is not suitable for allocation, and the controller may revise the charging and discharging power requested to be provided by the energy storage system in the power scheduling request to be within the user power range. For example, the charging and discharging power in the power scheduling request is 600 w, and the corresponding user power range is 500 w, and in this case, the controller 104 may revise the charging and discharging power in the power scheduling request to 500 w.

It can be understood that in some cases, for example, when the charging and discharging power in the power scheduling request is 100 w, and the corresponding user power range is 0 w (indicating that the energy storage system does not perform charging or discharging with the user equipment), and in this case, the controller 104 may discard the power scheduling request.

In this embodiment, the controller 104 may alternatively determine the actual user scheduling power based on the remaining chargeable and dischargeable energy. Specifically, if the remaining dischargeable electric energy in the remaining chargeable and dischargeable energy is less than a preset value, the controller 104 may set the actual user scheduling power corresponding to the power scheduling request to 0 (or another specific range). It can be understood that the preset value may be set to 0, and then when the remaining dischargeable electric energy is less than 0, it indicates that the energy storage system has no energy for use. In this case, the corresponding actual user scheduling power is usually set to 0. In other words, a discharging power scheduling instruction of the user equipment is actually not accepted any more. In some cases, to avoid a failure of the energy storage system because the remaining chargeable and dischargeable energy reaches 0, the preset value may be set to a value greater than 0, for example, 0.1 kilowatt-hour. A specific value of the preset value is not limited in this embodiment of this application. The remaining chargeable and dischargeable energy may be updated at time intervals. Steps for updating may be as follows:

(1) Determine an initial energy value of the user equipment based on a ratio of allocated stored energy that the user equipment is allowed to use to all energy currently stored in the energy storage system.

In this embodiment, the controller 104 may determine the initial energy value of the user equipment based on the ratio of the pre-allocated stored energy that the user equipment is allowed to use to all the energy currently stored in the energy storage system. For example, the user equipment A is allowed to use 1,000 kilowatts-hour of energy, the user equipment B is allowed to use 4,000 kilowatts-hour of energy, and all the energy currently stored in the energy storage system is 1,000 kilowatts-hour. In this case, during allocation based on the ratio, the initial energy value of the user equipment A should be 200 kilowatts-hour of energy, and the initial energy value of the user equipment B should be 800 kilowatts-hour of energy.

(2) Determine used energy corresponding to the user equipment at intervals of preset time segments based on the actual user scheduling power and a running time of the user equipment.

In this embodiment, the controller 104 may obtain the actual user scheduling power and the running time of the user equipment. For example, the actual user scheduling power may be obtained through detection or a feedback from the grid 101, or may be obtained from a result of performing step 203 last time, and the running time of the user equipment may be obtained through timing.

The preset time segment may be one minute, one hour, one second, or the like. This is not limited in this embodiment of this application.

At intervals of preset time segments, the controller 104 may determine the used energy corresponding to the user equipment based on the actual user scheduling power and the running time of the user equipment. For example, the actual user scheduling power of the user equipment A is 100 kilowatts, and a running time of the user equipment A is one hour. In this case, the controller 104 may learn, through calculation, that the used energy of the user equipment A is equal to the actual user scheduling power of the user equipment A times the running time, that is, equal to 100 kilowatts-hour. Calculation for another user equipment is similar.

(3) Determine remaining dischargeable electric energy of each user equipment based on the initial energy value corresponding to the user equipment and the used energy.

In this embodiment, the controller 104 may determine the remaining dischargeable electric energy of each user equipment (indicating how much energy has been left in the energy storage system to be discharged to the user equipment) by subtracting the used energy from the initial energy value corresponding to the user equipment. For example, the initial energy value of the user equipment A is 200 kilowatts-hour of energy, and the used energy of the user equipment A is 100 kilowatts-hour. In this case, the controller 104 may learn, through calculation, that the remaining dischargeable electric energy of the user equipment A is equal to 200 kilowatts-hour minus 100 kilowatts-hour, that is, equal to 100 kilowatts-hour. For each of other pieces of user equipment, the controller 104 may obtain remaining dischargeable electric energy corresponding to the user equipment through calculation.

(4) Calculate remaining chargeable electric energy of the user equipment based on the initial energy value corresponding to the user equipment and the remaining dischargeable electric energy.

In this embodiment, the controller 104 may determine the remaining chargeable electric energy based on the remaining dischargeable electric energy obtained through calculation and the initial energy value of the user equipment. To be specific, the remaining chargeable electric energy is equal to the initial energy value of the user equipment minus the remaining dischargeable electric energy. For example, the remaining dischargeable electric energy of the user equipment A is 100 kilowatts-hour, and the initial energy value of the user equipment A is 200 kilowatts-hour of energy. In this case, the remaining chargeable electric energy of the user equipment A is equal to 200 kilowatts-hour minus 100 kilowatts-hour, that is, equal to 100 kilowatts-hour. It can be understood that the remaining chargeable electric energy indicates energy that the energy storage system allows the user equipment to charge the energy storage system. If remaining chargeable electric energy of user equipment is less than a preset value, it indicates that the energy storage system does not allow the user equipment to charge the energy storage system. In this case, the controller 104 may adjust an actual user scheduling power of the user equipment to be not less than 0.

According to the foregoing steps, the controller 104 may update the remaining chargeable and dischargeable energy at time intervals, and the controller 104 may detect the remaining chargeable and dischargeable energy in real time. When detecting that the remaining chargeable and dischargeable energy is less than a preset value, the controller 104 may notify the energy storage system to stop providing energy, to avoid a deficiency of power supply of the energy storage system.

In step 203, the controller 104 may further adjust the actual user scheduling power based on updated remaining chargeable and dischargeable energy. To be specific, if the remaining chargeable and dischargeable energy is not within a preset range, the controller 104 may set the actual user scheduling power corresponding to the power scheduling request to a specific range (the specific range may be 0, not greater than 0, not less than 0, and the like, and the specific range may be set based on actual situations). Specifically, if the remaining dischargeable electric energy in the remaining chargeable and dischargeable energy is less than a first preset value, the actual user scheduling power corresponding to the power scheduling request is set to be not greater than 0 (so that the controller 104 does not accept a discharging power scheduling instruction of the user equipment any more); and if remaining chargeable electric energy in the remaining chargeable and dischargeable energy is less than a second preset value, the actual user scheduling power corresponding to the power scheduling request is set to be not less than 0 (so that the controller 104 does not accept a charging power scheduling instruction of the user equipment any more). It can be understood that the first preset value and the second preset value may be 0 or a value slightly greater than 0. In actual application, the controller 104 may reset the first preset value and the second preset value based on actual situations. Specific values of the first preset value and the second preset value are not limited in this embodiment of this application.

It can be understood that the remaining dischargeable electric energy in the remaining chargeable and dischargeable energy may be the exclusive usable energy, the shared usable energy, or the like in Table 1. If the controller 104 determines that a value of remaining dischargeable electric energy is less than a preset value, the controller 104 may set an actual user scheduling power corresponding to the remaining dischargeable electric energy to 0. For example, in the example shown in Table 1, if the controller 104 determines that the exclusive usable energy b1 is less than the preset value (which generally may be 0), it indicates that energy currently planned to provide to the user equipment A is very little, and the controller 104 may set an actual user scheduling power of the user equipment A to 0.

In embodiments in which the remaining dischargeable electric energy is further associated with a function category, if the controller 104 determines that a value of remaining dischargeable electric energy is less than a preset value, the controller 104 may set an actual user scheduling power for user equipment and a function category that correspond to the remaining dischargeable electric energy to 0. For example, in the example shown in Table 2, if the controller 104 determines that the exclusive usable energy b1 is less than the preset value (which generally may be 0), it indicates that energy currently planned to provide to the user equipment A for the function of the service of power supply reliability is very little, and the controller 104 may set an actual user scheduling power of the user equipment A for the function of the service of power supply reliability to 0. When summing up actual user scheduling powers, the controller 104 may add up all actual user scheduling powers of the user equipment A for all function categories.

204. Sum up all actual user scheduling powers and send a sum to the energy storage system.

In this embodiment, the controller 104 may sum up all the actual user scheduling powers and send the sum to the energy storage system. Specifically, the controller 104 may deliver all the actual user scheduling powers to the energy storage converter 102, so that the energy storage converter 102 can allocate an output power of the energy storage battery 103 based on all the actual user scheduling powers, or allocate electric energy transmitted from the grid 101 to the energy storage battery 103.

In this embodiment, after receiving all the actual user scheduling powers, the energy storage system may schedule the user equipment based on the actual user scheduling powers that are summed up. For example, in all the actual user scheduling powers, an actually schedulable power of the user equipment A is 500 w. In this case, the energy storage system may output a power of 500 w to the user equipment A. Specifically, the energy storage system may use the energy storage converter 102 to implement the foregoing solution.

In some embodiments, the controller 104 may obtain a total actually schedulable power after adding up all the actual user scheduling powers, and then send the total actually schedulable power to the energy storage system, so that the energy storage system outputs a power corresponding to the total actually schedulable power.

Figure 3:
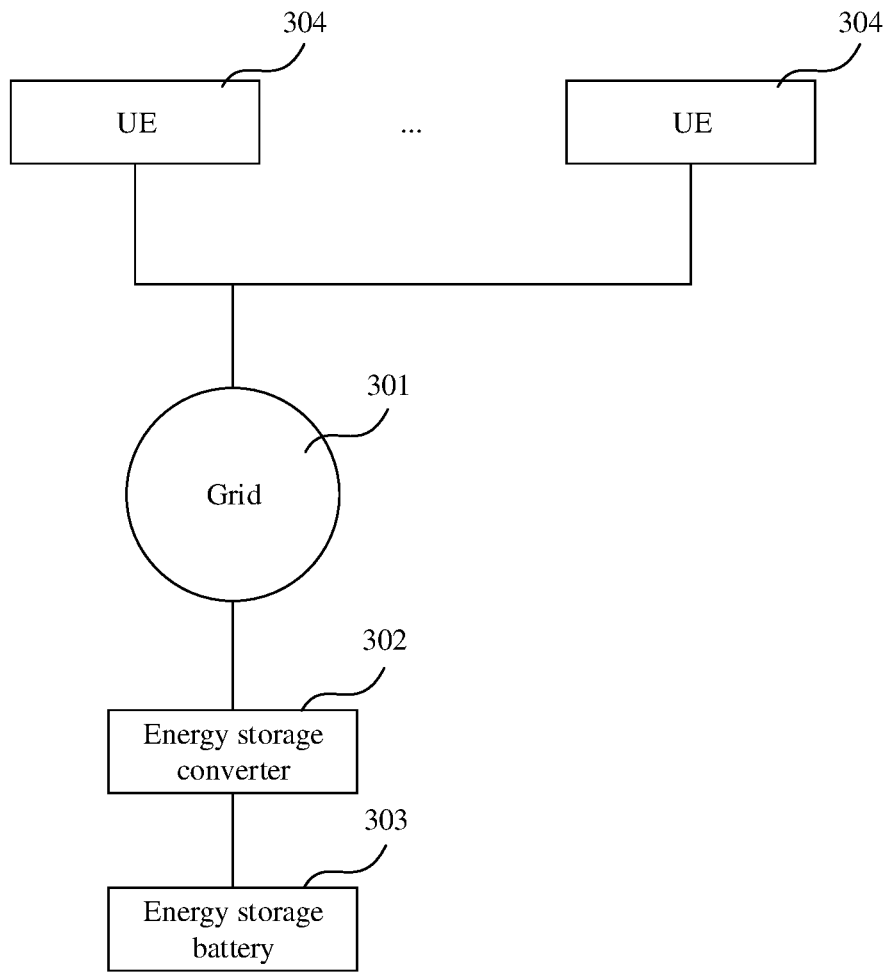
FIG. 3 is a schematic diagram of another energy storage system according to an embodiment of this application.

FIG. 3 is a schematic diagram of another energy storage system according to an embodiment of this application. The energy storage system includes an energy storage converter 302 and an energy storage battery 303. The energy storage battery 303 is connected to a grid 301 through the energy storage converter 302. The grid 301 and the energy storage battery 303 are similar to the grid 101 and the energy storage battery 303 in the foregoing embodiments corresponding to FIG. 1. User equipment 304 is similar to the user equipment 105 in the foregoing embodiments corresponding to FIG. 1.

The energy storage converter 302 may transmit, to the energy storage battery, electric energy delivered by the grid 301, and may transmit electric energy of the energy storage battery 303 to the grid 301. In addition, the energy storage converter 302 further includes a built-in scheduling module, where the scheduling module may perform the method in the foregoing embodiments corresponding to FIG. 2.

It can be understood that internal hardware of the scheduling module may include one or more central processing units, memories, communication buses, and communication interfaces. The memory is a short-term memory or a long-term memory, and the memory stores program code. The communication interface is configured to transmit and receive data. The central processing unit communicates with the memory through the communication bus, and executes the program code in the memory on a controller to perform the method in the foregoing embodiments corresponding to FIG. 2.

Figure 4:
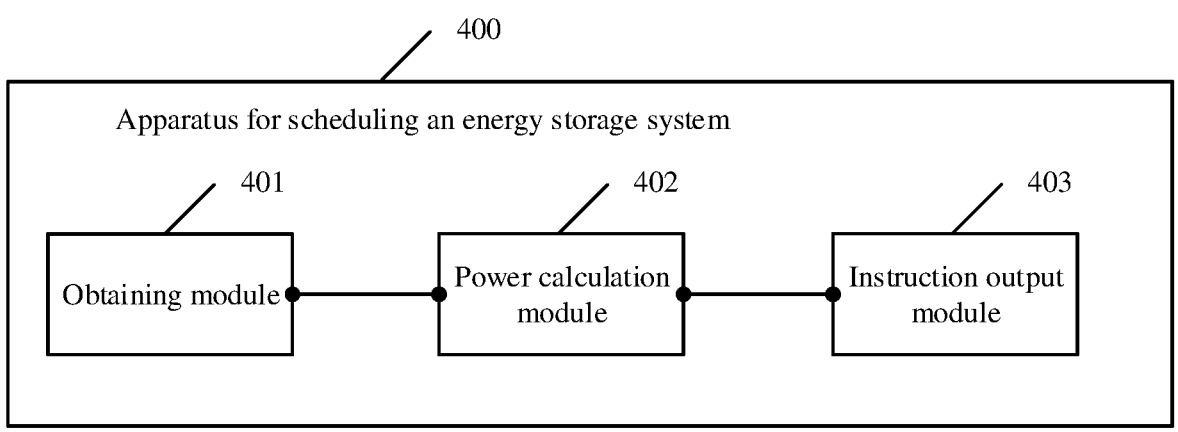
FIG. 4 is a schematic diagram of an apparatus for scheduling an energy storage system according to an embodiment of this application.

FIG. 4 is a schematic diagram of an apparatus for scheduling an energy storage system according to an embodiment of this application. The apparatus 400 for scheduling an energy storage system includes an obtaining module 401, a power calculation module 402, and an instruction output module 403.

The obtaining module 401 is configured to perform step 201 in various method embodiments corresponding to FIG. 2, or configured to perform step 202 in the various method embodiments corresponding to FIG. 2.

The power calculation module 402 is configured to perform step 203 in the various method embodiments corresponding to FIG. 2.

The instruction output module 403 is configured to perform step 204 in the various method embodiments corresponding to FIG. 2.

In some embodiments, the apparatus 400 for scheduling an energy storage system further includes a remaining energy update module, configured to perform a step for updating remaining chargeable and dischargeable energy in the various method embodiments corresponding to FIG. 2.

Figure 5:
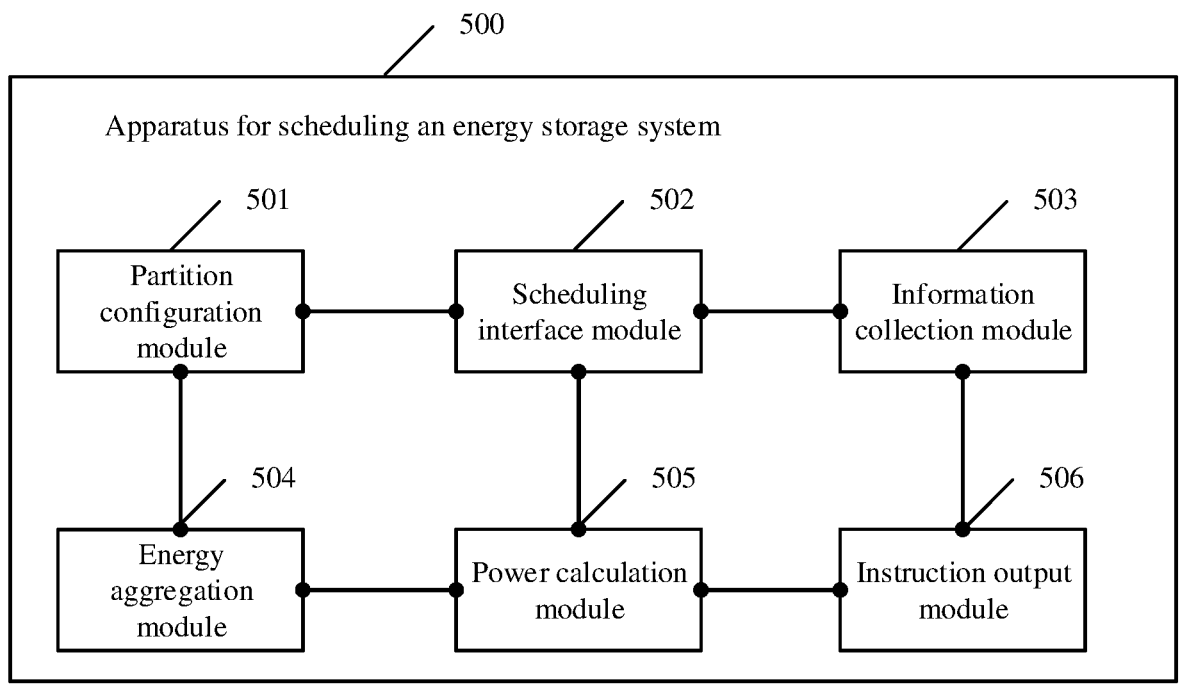
FIG. 5 is a schematic diagram of another apparatus for scheduling an energy storage system according to this application.

FIG. 5 is a schematic diagram of another apparatus for scheduling an energy storage system according to this application. The apparatus 500 for scheduling an energy storage system includes a partition configuration module 501, a scheduling interface module 502, an information collection module 503, an energy aggregation module 504, a power calculation module 505, and an instruction output module 506.

The partition configuration module 501 is configured to configure a user power range and remaining chargeable and dischargeable energy. For example, the partition configuration module 501 may be configured to configure a plurality of user power ranges and remaining chargeable and dischargeable energy shown in Table 1 or Table 2.

The scheduling interface module 502 is configured to perform step 201 in various method embodiments corresponding to FIG. 2.

The information collection module 503 is configured to obtain a configured user power range and remaining chargeable and dischargeable energy corresponding to user equipment, or configured to obtain updated remaining chargeable and dischargeable energy corresponding to the user equipment, or configured to obtain an actual user scheduling power and a running time of the user equipment.

The energy aggregation module 504 is configured to perform a step for updating remaining chargeable and dischargeable energy in the various method embodiments corresponding to FIG. 2.

The power calculation module 505 is configured to perform step 203 in the various method embodiments corresponding to FIG. 2.

The instruction output module 506 is configured to perform step 204 in the various method embodiments corresponding to FIG. 2.

Figure 6:
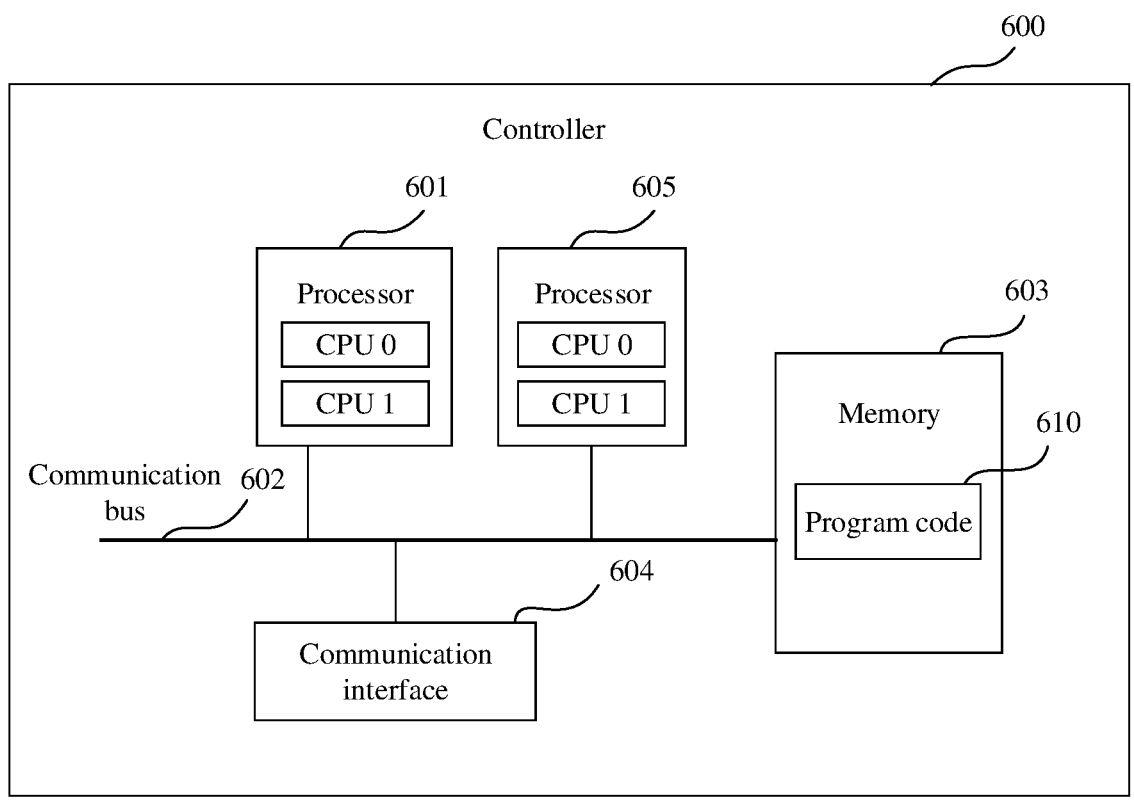
FIG. 6 is a schematic diagram of a controller according to an embodiment of this application.

FIG. 6 is a schematic diagram of a controller according to an embodiment of this application. The controller 600 includes one or more processors 601, a memory 603, and a communication interface 604, where the processor 601, the memory 603, and the communication interface 604 may be connected to each other through a communication bus 602. The memory 603 is configured to store one or more programs; and the one or more processors 601 are configured to run the one or more programs, to enable the controller 600 to perform the methods corresponding to the foregoing method embodiments. To be specific, the controller 600 may be the controller 104 in various embodiments corresponding to FIG. 1, or may be the scheduling module inside the energy storage converter 302 in various embodiments corresponding to FIG. 3.

The processor 601 may be a general-purpose central processing unit (CPU), a network processor (NP), a microprocessor, or may be one or more integrated circuits configured to implement the solutions of this application, for example, an application-specific integrated circuit (ASIC), a programmable logic device (PLD), or a combination thereof. The PLD may be a complex programmable logic device (CPLD), a field programmable gate array (FPGA), generic array logic (GAL), or any combination thereof.

The communication bus 602 is configured to transmit information between the foregoing components. The communication bus 602 may fall into the following types: an address bus, a data bus, a control bus, and the like. For ease of indication, the bus is indicated by using only one bold line in FIG. 6. However, it does not indicate that there is only one bus or only one type of bus.

The memory 603 may be a read-only memory (ROM) or another type of static storage device that can store static information and instructions, may be a random access memory (RAM) or another type of dynamic storage device that can store information and instructions, may be an electrically erasable programmable read-only memory (EEPROM), a compact disc read-only memory (CD-ROM) or another compact disc storage, an optical disc storage (including a compact optical disc, a laser disc, an optical disc, a digital versatile disc, a Blu-ray disc, and the like), a magnetic disk storage medium or another magnetic storage device, or may be any other medium that can be configured to carry or store expected program code in a form of instructions or a data structure and that can be accessed by a computer. However, the memory 603 is not limited thereto. The memory 603 may be standalone and connected to the processor 601 through the communication bus 602. Alternatively, the memory 603 may be integrated with the processor 601.

The communication interface 604 is configured to communicate with another device or a communication network through any apparatus such as a transceiver. The communication interface 604 includes a wired communication interface, and may further include a wireless communication interface. The wired communication interface may be, for example, an Ethernet interface. The Ethernet interface may be an optical interface, an electrical interface, or a combination thereof. The wireless communication interface may be a wireless local area network (WLAN) interface, a cellular network communication interface, a combination thereof, or the like.

During specific implementation, in an embodiment, the processor 601 may include one or more CPUs, for example, a CPU 0 and a CPU 1 shown in FIG. 6.

During specific implementation, in an embodiment, the controller 600 may include a plurality of processors, for example, the processor 601 and a processor 605 shown in FIG. 6. Each of the processors may be a single-core (single-CPU) processor or may be a multi-core (multi-CPU) processor. The processor herein may refer to one or more devices, circuits, and/or processing cores configured to process data (such as computer program instructions).

During specific implementation, in an embodiment, the controller 600 may further include an output device and an input device. The output device communicates with the processor 601, and may display information in a plurality of manners. For example, the output device may be a liquid crystal display (LCD), a light emitting diode (LED) display device, a cathode ray tube (CRT) display device, a projector, or the like. The input device communicates with the processor 601, and may receive an input from a user in a plurality of manners. For example, the input device may be a mouse, a keyboard, a touchscreen device, or a sensing device.

In some embodiments, the memory 603 is configured to store program code 610 for executing the solutions of this application, and the processor 601 may execute the program code 610 stored in the memory 603. To be specific, the controller 600 may implement a packet processing method provided in the method embodiments by using the processor 601 and the program code 610 in the memory 603.

The controller 600 in this embodiment may correspond to the gateway device in the foregoing method embodiments. In addition, the processor 601, the communication interface 604, and the like in the controller 600 may implement functions of the gateway device and/or various steps and methods that are implemented by the gateway device in the foregoing method embodiments.

It should be understood that the controller 600 corresponds to the controller 104 or the scheduling module inside the energy storage converter 302 in the foregoing method embodiments. Various units in the controller 600 and the foregoing other operations and/or functions are respectively intended for implementing the method shown in FIG. 2. For specific details, refer to the foregoing method embodiments.

It may be clearly understood by a person skilled in the art that, for purpose of convenient and brief description, for a detailed working process of the foregoing system, apparatus, and unit, refer to a corresponding process in the foregoing method embodiments.

In the several embodiments provided in this application, it should be understood that the disclosed system, apparatus, and method may be implemented in another manner. For example, the described apparatus embodiments are merely examples. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in an electronic, a mechanical, or another form.

The units described as separate parts may or may not be physically separate, and parts displayed as units may or may not be physical units, that is, may be located in one position, or may be distributed on a plurality of network units. Some or all of the units may be selected based on actual requirements to achieve the objectives of the solutions in the embodiments.

In addition, function units in embodiments of this application may be integrated into one processing unit, or each of the units may exist alone physically, or two or more units are integrated into one unit. The integrated unit may be implemented in a form of hardware, or may be implemented in a form of a software function unit.

When the integrated unit is implemented in the form of a software functional unit and is sold or used as an independent product, the integrated unit may be stored in a computer-readable storage medium. Based on such an understanding, the technical solutions of this application essentially, or the part contributing to a current technology, or all or some of the technical solutions may be implemented in a form of a software product. The computer software product is stored in a storage medium and includes several instructions for instructing a computer device (which may be a personal computer, a server, or a network device) to perform all or some of the steps of the methods described in embodiments of this application. The foregoing storage medium includes any medium that can store program code, such as a USB flash drive, a removable hard disk, a read-only memory (ROM), a random access memory (RAM), a magnetic disk, or an optical disc.

The foregoing embodiments are merely intended for describing the technical solutions of this application, but not for limiting this application. Although this application is described in detail with reference to the foregoing embodiments, a person of ordinary skill in the art should understand that modifications to the technical solutions recorded in the foregoing embodiments or equivalent replacements to some technical features thereof may still be made, without departing from the scope of the technical solutions of embodiments of this application.

What is claimed is:

1. An energy storage system, comprising battery pack, a converter, and a controller, wherein the battery packs are a plurality of sets of battery packs or a plurality of battery packs connected to a grid through the converter, at least one piece of user equipment is connected to the grid, and each of the at least one piece of user equipment comprises electrical equipment and/or power supply equipment;

the controller is connected to the converter and the battery packs and the controller is configured to:

communicate with each of the at least one piece of user equipment and obtain information about the user equipment; and control the converter and the battery packs based on the information about the user equipment, to provide electric energy to the electrical equipment or receive electric energy from the power supply equipment.

2. The energy storage system according to claim 1, wherein the electrical equipment comprises at least one of a factory power distribution mom, a power distribution room in a residential quarter, or a substation, and the power supply equipment comprises at least one of another energy storage system, a photovoltaic power generation system, a wind power generation system, or a power plant.

3. The energy storage system according to claim 1, wherein the controller is further configured to:

obtain actual user scheduling powers of all pieces of user equipment based on the information about the user equipment; and control the converter to output a power corresponding to a sum of the actual user scheduling powers of all the pieces of user equipment to the grid.

4. The energy storage system according to claim 1, wherein the controller is further configured to:

obtain at least one power scheduling request from the user equipment, wherein each of the at least one power scheduling request comprises a charging and discharging power of the energy storage system requested by the user equipment;

obtain a configured user power range and remaining chargeable and dischargeable energy that correspond to the user equipment, wherein the configured user power range indicates a range of charging and discharging power allocated by the energy storage system to the user equipment, the remaining chargeable and dischargeable energy comprises remaining dischargeable electric energy, the remaining dischargeable electric energy indicates energy that excludes used energy and remains in energy allocated by the energy storage system to the user equipment, and the used energy is energy that the energy storage system has actually scheduled to the user equipment;

obtain an actual user scheduling power corresponding to the power scheduling request based on the power scheduling request, the configured user power range, and the remaining chargeable and dischargeable energy; and sum up all the actual user scheduling powers and send a sum to the energy storage system, so that the energy storage system schedules the user equipment based on the actual user scheduling powers that are summed up.

5. The energy storage system according to claim 4, wherein the controller is further configured to:

in response to determination that the charging and discharging power of the energy storage system requested by the user equipment in the power scheduling request is out of the configured user power range, revise the charging and discharging power requested to be provided by the energy storage system to be within the configured user power range.

6. The energy storage system according to claim 4, wherein the configured user power range is associated with the user equipment and a function category, and the function category indicates a function requested by the user equipment; and the controller is further configured to:

obtain, based on the power scheduling request, a user equipment identifier and a function category identifier that correspond to the charging and discharging power; and obtain the configured user power range corresponding to the user equipment identifier and the function category identifier.

7. The energy storage system according to claim 4, wherein the controller is further configured to:

in response to determination that the remaining chargeable and dischargeable energy is not within a preset range, set the actual user scheduling power corresponding to the power scheduling request to a specific range.

8. The energy storage system according to claim 7, wherein the controller is further configured to:

in response to determination that the remaining dischargeable electric energy in the remaining chargeable and dischargeable energy is less than a first preset value, set the actual user scheduling power corresponding to the power scheduling request to be not greater than 0; and in response to determination that remaining chargeable electric energy in the remaining chargeable and dischargeable energy is less than a second preset value, set the actual user scheduling power corresponding to the power scheduling request to be not less than 0, wherein the remaining chargeable electric energy indicates energy that the energy storage system allows the user equipment to charge the energy storage system.

9. The energy storage system according to claim 4, wherein the controller is further configured to:

update the remaining chargeable and dischargeable energy at intervals of preset time segments based on the actual user scheduling power and a running time of the user equipment.

10. The energy storage system according to claim 9, wherein the controller is further configured to:

obtain an initial energy value of the user equipment based on a ratio of allocated stored energy that the user equipment is allowed to use to all energy stored in the energy storage system;

obtain used energy corresponding to the user equipment at intervals of preset time segments based on the actual user scheduling power and the running time of the user equipment;

obtain remaining energy of the user equipment based on the initial energy value corresponding to the user equipment and the used energy; and obtain the remaining chargeable and dischargeable energy by summing up the remaining energy of the user equipment.

11. A method for scheduling an energy storage system, comprising:

obtaining at least one power scheduling request from user equipment, wherein the power scheduling request comprises a charging and discharging power of the energy storage system requested by the user equipment;

obtaining a configured user power range and remaining chargeable and dischargeable energy that correspond to the user equipment, wherein the confound user power range indicates a range of charging and discharging power allocated by the energy storage system to the user equipment, the remaining chargeable and dischargeable energy comprises remaining dischargeable electric energy, the remaining dischargeable electric energy indicates energy that excludes used energy and remains in energy allocated by the energy storage system to the user equipment, and the used energy is energy that the energy storage system has actually scheduled to the user equipment;

obtaining an actual user scheduling power corresponding to the power scheduling request based on the power scheduling request, the configured user power range, and the remaining chargeable and dischargeable energy; and summing up all the actual user scheduling powers and sending a sum to the energy storage system, so that the energy storage system schedules the user equipment based on the actual user scheduling powers that are summed up.

12. The method according to claim 11, wherein the obtaining an actual user scheduling power based on the power scheduling request, the configured user power range, and the remaining chargeable and dischargeable energy comprises:

in response to determination that if the charging and discharging power of the energy storage system requested by the user equipment in the power scheduling request is out of the configured user power range, revising the charging and discharging power requested to be provided by the energy storage system to be within the configured user power range.

13. The method according to claim 11, wherein the configured user power range is associated with the user equipment and a function category, and the function category indicates a function requested by the user equipment; and the obtaining a configured user power range corresponding to the user equipment comprises:

obtaining, based on the power scheduling request, a user equipment identifier and a function category identifier that correspond to the charging and discharging power; and obtaining the configured user power range corresponding to the user equipment identifier and the function category identifier.

14. The method according to claim 11, wherein the obtaining an actual user scheduling power corresponding to the power scheduling request based on the power scheduling request, the configured user power range, and the remaining chargeable and dischargeable energy comprises:

setting the actual user scheduling power corresponding to the power scheduling request to a specific range when the remaining chargeable and dischargeable energy is not within a preset range.

15. The method according to claim 14, wherein the setting the actual user scheduling power corresponding to the power scheduling request to a specific range when the remaining chargeable and dischargeable energy is not within a preset range comprises:

in response to determination that the remaining dischargeable electric energy in the remaining chargeable and dischargeable energy is less than a first preset value, setting the actual user scheduling power corresponding to the power scheduling request to be not greater than 0; and in response to determination that remaining chargeable electric energy in the remaining chargeable and dischargeable energy is less than a second preset value, setting the actual user scheduling power corresponding to the power scheduling request to be not less than 0, wherein the remaining chargeable electric energy indicates energy that the energy storage system allows the user equipment to charge the energy storage system.

16. The method according to claim 11, wherein after the summing up all the actual user scheduling powers and sending a sum to the energy storage system, the method further comprises:
updating the remaining chargeable and dischargeable energy at intervals of preset time segments based on the actual user scheduling power and a running time of the user equipment.

17. The method according to claim 16, wherein the updating the remaining chargeable and dischargeable energy at intervals of preset time segments based on the actual user scheduling power and a running time of the user equipment comprises:
obtaining an initial energy value of the user equipment based on a ratio of allocated stored energy that the user equipment is allowed to use to all energy stored in the energy storage system;
obtaining used energy corresponding to the user equipment at intervals of preset time segments based on the actual user scheduling power and the running time of the user equipment;
obtaining remaining energy of each user equipment based on the initial energy value corresponding to the user equipment and the used energy; and
obtaining the remaining chargeable and dischargeable energy by summing up the remaining energy of the user equipment.

* * * * *

UNITED STATES PATENT AND TRADEMARK OFFICE
CERTIFICATE OF CORRECTION

| | |
|---|---|
| PATENT NO. | : 11,757,285 B2 |
| APPLICATION NO. | : 17/743593 |
| DATED | : September 12, 2023 |
| INVENTOR(S) | : Chang Hei |

Page 1 of 1

It is certified that error appears in the above-identified patent and that said Letters Patent is hereby corrected as shown below:

In the Claims

- Column 19, Claim 1, Line 66, change "pack" to "packs";

- Column 20, Claim 2, Line 19, change "mom" to "room";

- Column 21, Claim 11, Line 67, change "confound" to "configured"; and

- Column 22, Claim 12, Line 27, change "that if" to "that".

Signed and Sealed this
Tenth Day of October, 2023

Katherine Kelly Vidal
*Director of the United States Patent and Trademark Office*